(12) United States Patent
Sawada

(10) Patent No.: US 7,530,157 B2
(45) Date of Patent: May 12, 2009

(54) METHOD OF FORMING COILS OF A STATOR OF A ROTARY ELECTRIC MACHINE

(75) Inventor: Yukinori Sawada, Handa (JP)

(73) Assignee: Denso Corporation, Kariya (JP)

( * ) Notice: Subject to any disclaimer, the term of this patent is extended or adjusted under 35 U.S.C. 154(b) by 13 days.

(21) Appl. No.: 11/882,525

(22) Filed: Aug. 2, 2007

(65) Prior Publication Data

US 2007/0294876 A1    Dec. 27, 2007

Related U.S. Application Data

(62) Division of application No. 11/036,353, filed on Jan. 18, 2005, now Pat. No. 7,293,350.

(30) Foreign Application Priority Data

Jan. 30, 2004  (JP)  ............................. 2004-022976

(51) Int. Cl.
  *H02K 15/00*  (2006.01)
(52) U.S. Cl. .......................... 29/596; 29/564.1; 29/605; 29/606
(58) Field of Classification Search ............... 29/732, 29/564.5, 605, 606, 596, 597, 598; 310/179, 310/180, 184, 196, 216
See application file for complete search history.

(56) References Cited

U.S. PATENT DOCUMENTS

| | | | |
|---|---|---|---|
| 4,437,230 A | 3/1984 | Greutmann | |
| 5,332,939 A | 7/1994 | Fanning et al. | |
| 5,778,512 A | 7/1998 | Ichikawa et al. | |
| 6,425,175 B1 | 7/2002 | Sawada et al. | |
| 6,938,323 B2 | 9/2005 | Katou | |
| 7,140,098 B2 * | 11/2006 | Maeda et al. | 29/732 |
| 2002/0053126 A1 | 5/2002 | Maeda et al. | |

FOREIGN PATENT DOCUMENTS

| | | |
|---|---|---|
| JP | B2-3199068 | 6/2001 |
| JP | 2002-0053126 | 5/2002 |
| JP | A-2003-199304 | 7/2003 |

\* cited by examiner

*Primary Examiner*—William M Brewster
*Assistant Examiner*—Dan D Le
(74) *Attorney, Agent, or Firm*—Oliff & Berridge, PLC

(57) ABSTRACT

A method of manufacturing coils that includes forming a predetermined number of U-shaped conductor segments. The U-shaped conductor segments are twisted using first twisting formation jig composed of a first inside ring and a first outside ring and a second twisting formation jig composed of a second inside ring and a second outside ring. The U-shaped conductor segments that are twist formed in radially inward directions are radially compressed. The U-shaped conductor segments are twist formed by holding one of each pair of straight portions by holding slots that are circumferentially formed in each of a first and second inside rings and first and second outside rings. Next, first and second inside rings and the first and second outside rings are coaxially rotated.

3 Claims, 9 Drawing Sheets

METHOD OF FORMING COILS OF A STATOR OF A ROTARY ELECTRIC MACHINE

This is a Division of application. Ser. No. 11/036,353 filed Jan. 18, 2005. The disclosure of the prior application is hereby incorporated by reference herein in its entirety.

CROSS REFERENCE TO RELATED APPLICATION

The present application is based on and claims priority from Japanese Patent Application 2004-22976, filed Jan. 30, 2004, the contents of which are incorporated herein by reference.

BACKGROUND OF THE INVENTION

1. Field of the Invention

The present invention relates to a coil forming apparatus which forms coils to be mounted in slots of a stator core of a rotary electric machine from U-shaped conductor segments and a method of forming such coils.

2. Description of the Related Art

In a rotary electric machine such as a generator or a motor, a plurality of conductor segments is mounted into slots of a stator core to form a stator coil through a step of welding the respective ends of conductor segments in a well-known manner.

As shown in FIG. 11A, a hairpin-like conductor segment 100 having a U-turn portion and a pair of parallelly extending flat straight portions 120, 130 are preliminarily formed. Subsequently, the straight portions 120, 130 are twisted and pulled away from each other so that flat and wider surfaces become parallel to each other, as shown in FIG. 11B. Thereafter, the straight portions 120, 130 are inserted into a pair of slots of a stator core 310, as shown in FIG. 14.

U.S. Pat. No. 6,425,175 B1 discloses a pair of U-shaped conductor segments 100a, 100b, which are shown in FIG. 12 of this application and a twisting formation apparatus that twists a turn portion 110 of the conductor segments 100a, 100b, as shown in FIG. 13. The twisting formation apparatus has coaxially coupled inside ring 210 and an outside ring 220. Each of the rings 210, 220 has a plurality of circumferentially disposed holding slots whose cross-section is rectangular. The number of the holding slots of the inside and outside rings is the same as the number of slots of a stator core 310, which is shown in FIG. 14.

Although the above twisting formation apparatus is good for manufacturing a stator having four conductors each slot, it can not be applied to manufacturing a stator having six or more conductors each slot because the outermost turn portion of threefold U-shaped conductor segments excessively projects from a stator core, resulting in a stator having a very large axial size and a very heavy weight.

SUMMARY OF THE INVENTION

It is an object of the invention to provide a coil forming apparatus that can manufacture a stator having six or more conductors each slot that is not very large in axial size or in weight.

According to a feature of the invention, a coil forming apparatus for manufacturing coils of a stator of a rotary electric machine having a predetermined number of stator slots includes a twisting formation unit for twist-forming a predetermined number of U-shaped conductor segments each of which has a pair of parallelly extending straight portions and a turn portion connecting the straight portion. The twisting formation unit includes a first twisting formation jig composed of a first inside ring and a first outside ring and a second twisting formation jig composed of a second inside ring and a second outside ring. Each of the first and second inside rings has the same number of circumferentially disposed holding slots as the stator slots to hold one of each pair of straight portions. Each of the first and second outside rings also has the same number of circumferentially disposed holding slots as the stator slots to hold the other of each pair of straight portions. The first and second inside rings and the first and second outside rings are coaxially coupled to shift relative circumferential position between the inside rings and the outside rings by a predetermined angle to twist the turn portions.

In addition to the above feature, at least one of the first and second twisting formation jigs can twist pairs of U-shaped conductor segments that have different-sized turn portions. The twisting formation unit may include knocking bars for discharging the conductor segments from the first and second twisting formation jigs, and the first and second twisting formation jigs are preferably movable relative to the knocking bars when discharging the conductor segments from the first and second twisting formation jigs.

The coil forming apparatus may further include a compressing formation unit for radially compressing the U-shaped conductor segment that are twist-formed by the twisting formation unit in radially inward directions. The formation unit of this coil forming apparatus may include a metal core having a cylindrical outer periphery for setting a diameter of an inscribed circle of the conductor segments, a plurality of guiding arrow members respectively disposed in radial directions at equal intervals to form guide spaces between the guiding arrow members, a plurality of thrusting arrow members respectively disposed in the guide spaces to compress the conductor members in radially inner directions when straight portions of the conductor segments are disposed in the guide spaces, means for radially moving the thrusting arrow members to provide a cylindrical space for accommodating straight portions of the conductor segments around the cylindrical outer periphery of the metal core when moving the thrusting arrow members radially outward. In this coil forming apparatus the means for radially moving may include spring members each of which is disposed between one of the thrusting arrow members and one of said guiding arrow members.

Another object of the invention is to provide a method of forming coils of a stator of a rotary electric machine.

According to another feature of the invention, a method includes a step of twist-forming all the straight portions by the first and second twisting formation units that are described above, a step of discharging all the straight portions from the first and second twisting formation units, a step of sending all the straight portions from the first and second twisting formation units to the guide spaces and a step of pushing all the straight portions into the cylindrical space and pushing at least a radially outside portion of the straight portions to radially inside portion thereof to be close to each other.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A coil forming apparatus 1 according to a preferred embodiment of the present invention will be described with reference to the appended drawings.

Figure 1:
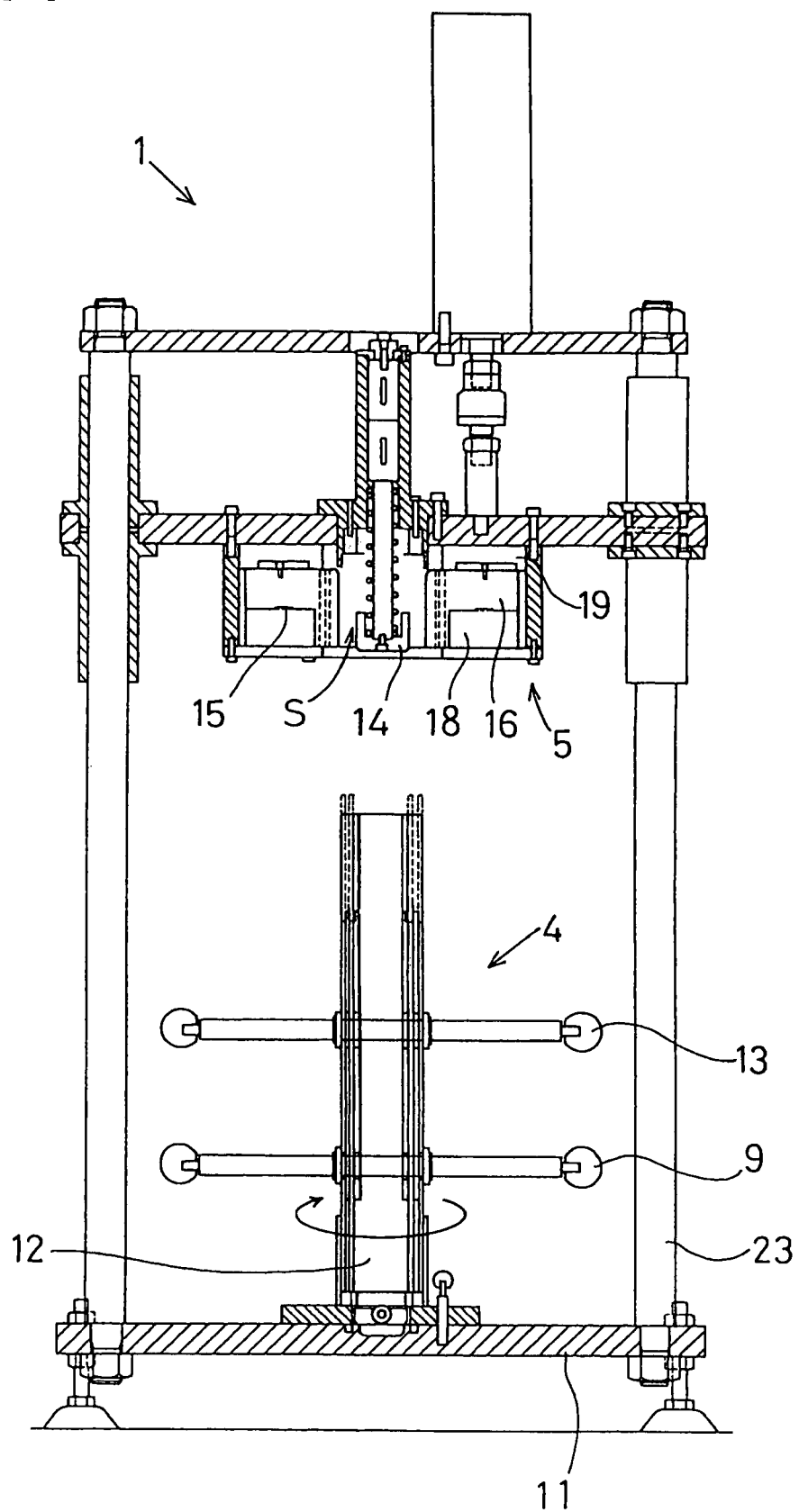
FIG. 1 is a longitudinally cross-sectional view illustrating a coil forming apparatus according to the preferred embodiment of the invention; forming apparatus according to the preferred embodiment of the invention.
Figure 2:
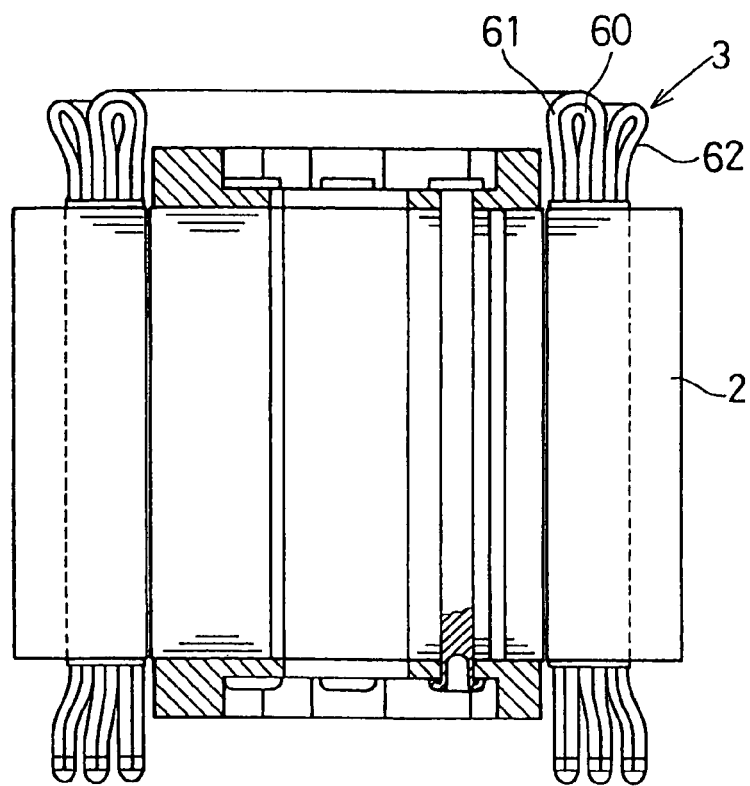
FIG. 2 is a longitudinally cross-sectional view illustrating a stator manufactured by the coil forming apparatus according to a preferred embodiment of the invention and a rotor.

As shown in FIG. 1, the coil forming apparatus 1 is to form a stator coil 3 mounted in a stator core 2 of a generator or a motor and includes a twisting formation unit 4 and a compressing formation unit 5.

The stator coil 3 is composed of a first group of first conductor segments 60, a second group of second conductor segments 61 and a third group of third conductor segments 62.

Figure 3:
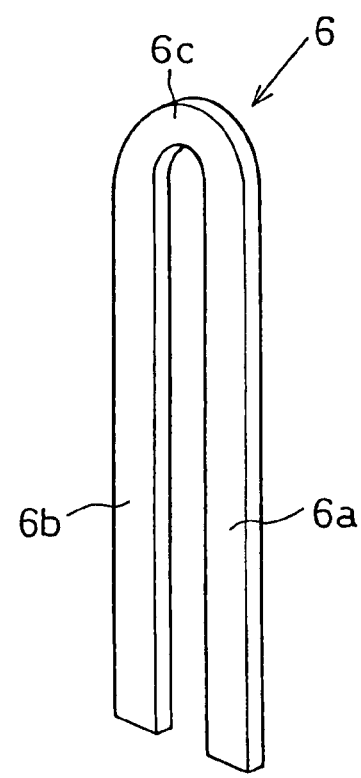
FIG. 3 is a perspective view illustrating a conductor segment to be inserted in a slot of the stator shown in FIG. 2.
Figure 4:
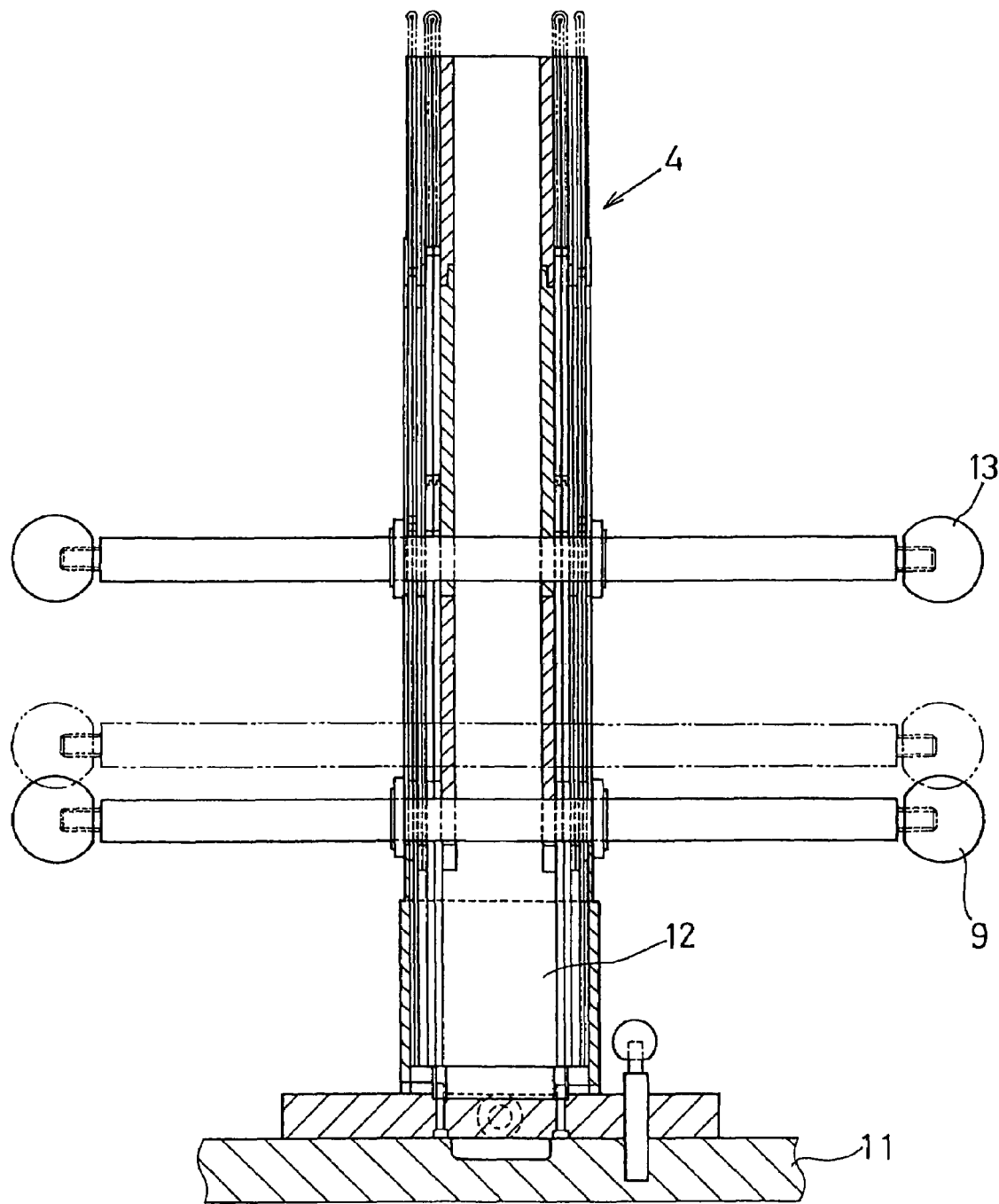
FIG. 4 is a longitudinally cross-sectional longitudinal view of a twisting formation unit of the coil forming apparatus according to the preferred embodiment.
Figure 7:
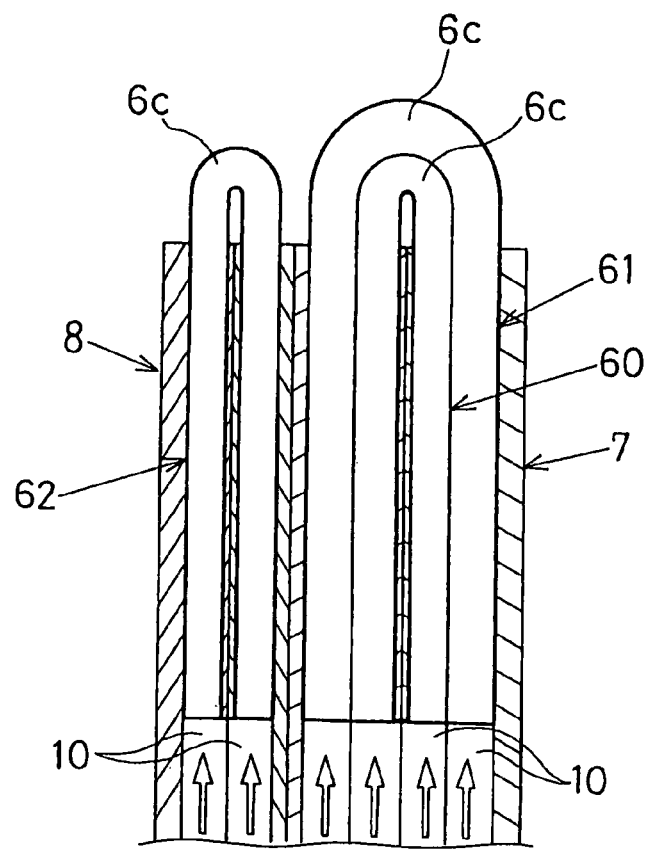
FIG. 7 is a longitudinally cross-sectional view illustrating the twisting formation jig.

As shown in FIG. 3, a U-shaped conductor segments 6 (60, 61 or 62) before forming has a pair of parallely extending straight portions 6a, 6b and a turn portion 6c that connects the straight portions 6a, 6b. As shown in FIG. 7, the turn portion 6c of the first conductor segment 60 is different in radius from the second conductor segments 61 and same as the third conductor segment 62.

The twisting formation unit 4 includes a first twisting formation jig 7 that forms the first group of the first conductor segments 60 and the second group of the second conductor segments 61, a second twisting formation jig 8 that forms the third group of the third conductor segments 62, a twisting lever 9 that causes the first and second twisting formation jigs 7, 8 twisting operation, knocking bars 10 that discharge the conductor segments 60-62 from the twisting formation jigs 7, 8, etc. The twisting formation unit 4 is fixed to a base plate 11 and supported by a supporting post 12 so that it can move up and down.

Figure 5:
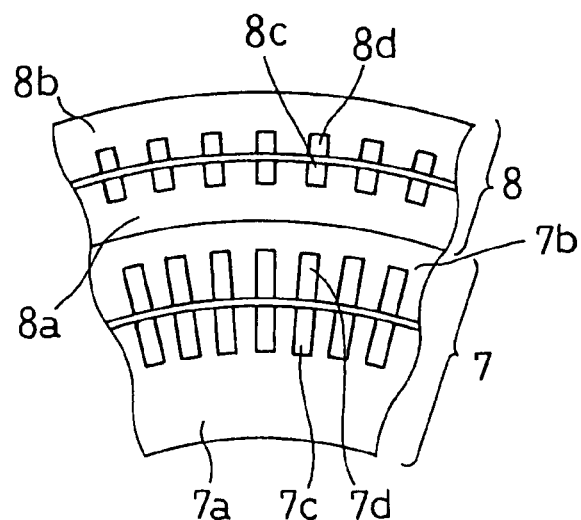
FIG. 5 is a fragmentary plan view illustrating a portion of the twisting formation unit.
Figure 6:
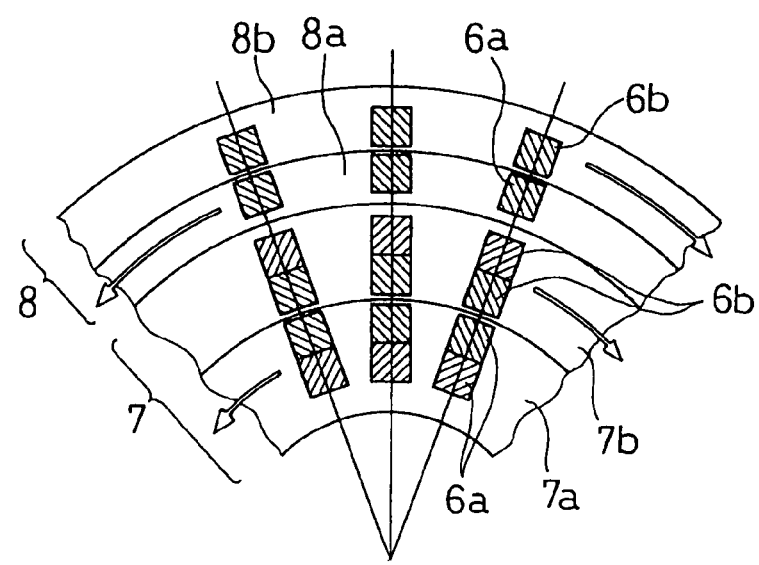
FIG. 6 is a schematic diagram illustrating a step of twisting formation.

The first twisting formation jig 7 has a coaxially coupled pair of an inside ring 7a and an outside ring 7b, and the second twisting formation jigs 8 has a coaxially coupled pair of inside ring 8a and an outside ring 8b. The inside ring 8a of the second twisting formation jig 8 is also coaxially disposed around the outside ring 7b of the first twisting formation jig 7, so that all the rings 7a, 7b, 8a, 8b are coaxially disposed, as shown in FIG. 5. In other words, the second twisting formation jig 8 is disposed around the first twisting formation jig 7.

The inside ring 7a of the first twisting formation jig 7 has as many outwardly open inside holding slots 7c in the circumferential direction thereof at equal intervals as the slots of the stator core to which the conductor segments 6 are mounted, and the outside ring 7b of the first twisting formation jig 7 has the same number of inwardly open outside holding slots 7d to correspond to the holding slots 7c. The inside ring 8a of the second twisting formation jig 8 has the same number of outwardly open inside holding slots 8c as the holding slots 7c, and the outside ring 8b of the second twisting formation jig 8 has the same number of inwardly open outside holding slots 8d to correspond to the holding slots 8c.

The inside holding slot 7c of the first twisting formation jig 7 has a rectangular cross-section whose radial sides (or depth) are long enough to accommodate the straight portions 6a of radially aligned two conductor segments 60, 61. The outside holding slot 7d of the first twisting formation jig 7 has a rectangular cross-section whose radial sides are long enough to accommodate the straight portions 6b of the radially aligned first and second conductor segments 60, 61.

The inside holding slot 8c of the second twisting formation jig 8 has a rectangular cross-section whose radial sides are long enough to accommodate the straight portion 6a of the third conductor segments 62. The outside holding slot 7d of the second twisting formation jig 8 has a rectangular cross-section whose radial sides are long enough to accommodate the straight portion 6b of the conductor segments 62. Therefore, the radial depth of the holding slots 8c, 8d of the second twisting formation jig 8 is about a half the radial depth of the holding slots 7c, 7d of the first twisting formation jig 7.

The first and the second twisting formation jigs 7, 8 are adjusted so that all the holding slots 7c, 7b, 8c, 8d can be disposed at the same angular or circumferential position. Then, the first and second conductor segments 60, 61, which are coupled so that the second conductor segment 61 mounts on the first conductor segment 60, are set to the first twisting formation jig 8, and the third conductor segments 62 are set to the second twisting formation jig 8, as shown in FIG. 7.

The twisting lever 9 is linked with the outside ring 7b of the first twisting formation jig 7 and the outside ring 8b of the second twisting formation jig 8 to turn the outside rings 7b, 8b in the same direction. On the other hand, the inside ring 7a of the first twisting formation jig 7 and the inside ring 8a of the second twisting formation jig 8 are fixed to the supporting post 12. Therefore, the inside ring 7a of the first twisting formation jig 7 turns relative to the outside ring 7b of the same, and the inside ring 8a of the second twisting formation jig 7 turns relative to the outside ring 8b of the same.

The knocking bars 10 are disposed under the first and second twisting formation jigs 7, 8 at positions opposite the respective holding slots 7c, 7d, 8c, 8d.

The first and second twisting formation jigs 7, 8 are supported by the supporting post 12 so that they can be moved by an up-down lever 13 up and down relative to the knocking bars 10. When the first and second twisting formation jigs 7, 8 are moved down, the first, second and third conductor segments are knocked by the knocking bars to move upward from the first and second twisting formation jigs 7, 8.

Figure 8:
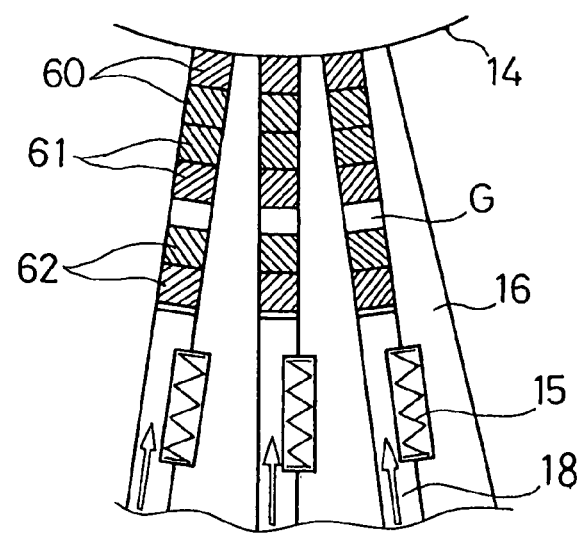
FIG. 8 is a schematic cross-sectional plan view illustrating a portion of a compressing formation unit.

The compression formation unit 5 is supported by supporting poles 23, as shown in FIG. 1, to eliminate gaps G formed between the second conductor segments 61 and the third conductor segments 62, as shown in FIG. 8. The compression formation unit 5 includes a metal core 14, a plurality of coil springs 15, a plurality of guiding arrow members 16, a plurality of thrusting arrow members 18, a cam plate 19, etc.

The metal core 14 is a cylindrical member that has an outer periphery for setting the diameter of the inscribed circle of the first group of the first conductor segments 60.

Figure 9:
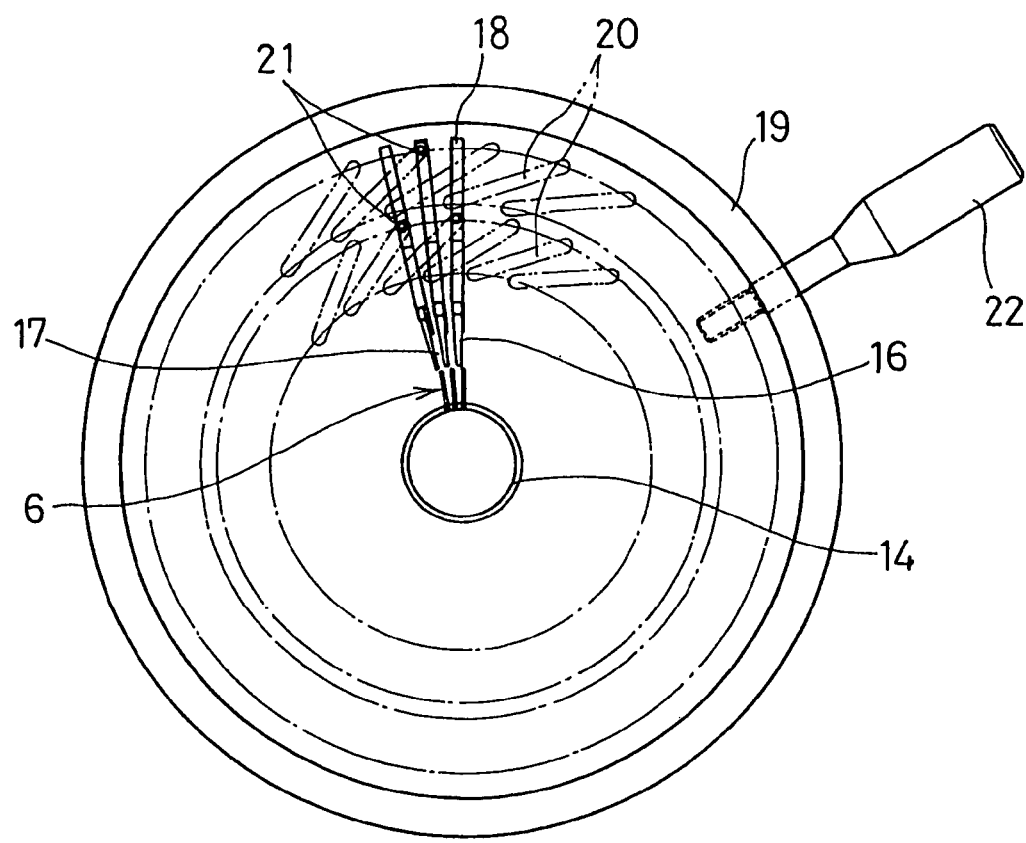
FIG. 9 is a plan view illustrating a cam mechanism.

The plurality of guiding arrow members 16 is disposed around the metal core 14 in radial directions at equal intervals so as to provide guide spaces 17 between guiding arrow members 16 and to radially move back and forth, as shown in FIG. 9. When the guiding arrow members 16 move back, a cylindrical space S is provided around the metal core 14 to take the first-third conductor segments 60-62 therein, as shown in FIG. 1.

The plurality of thrusting arrow members 18 is moved by the cam plate 19 in radial directions. As shown in FIG. 9, the cam plate 19 has a plurality of cam grooves 20 and a plurality of cam pins 21, each of which engages one of the cam groove and links with the thrusting arrow members 18. The cam grooves 20 are formed straight but slantingly disposed in two ring zones of the cam plate 19 so that the cam pins 21 and the thrusting arrow members 18 can move back and forth in radial directions of the cam plate 19 when the cam plate 19 turns back and forth.

Each coil spring 15 is disposed between one of the thrusting arrow members 18 and one of the guiding arrow members 16, as shown in FIG. 8, to push the guiding arrow member 16 radially inward when the thrusting arrow member 18 moves radially inward.

Figure 10:
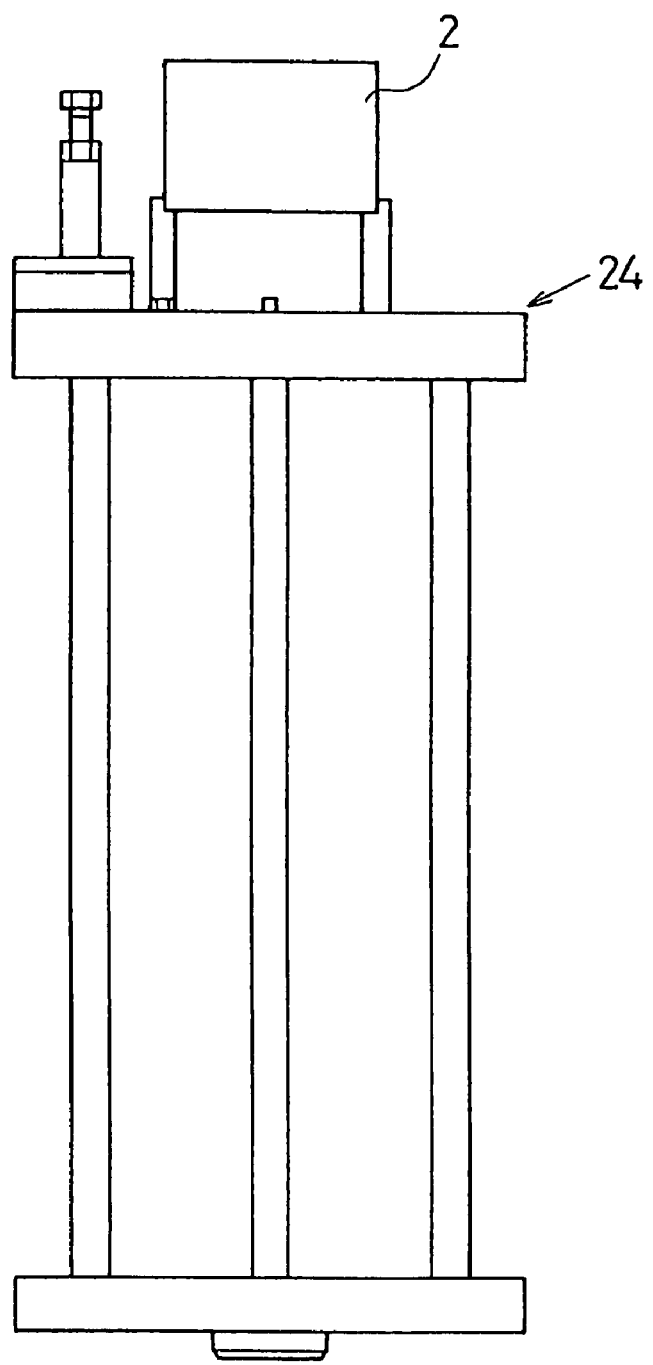
FIG. 10 is a side view illustrating a stator core holder.
Figure 11A:
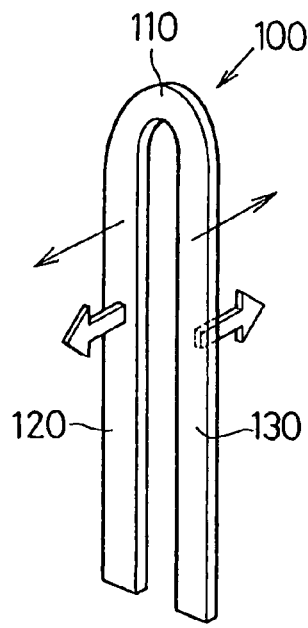
FIGS. 11A and 11B are perspective views illustrating a prior art step of manufacturing a conductor segment.
Figure 11B:
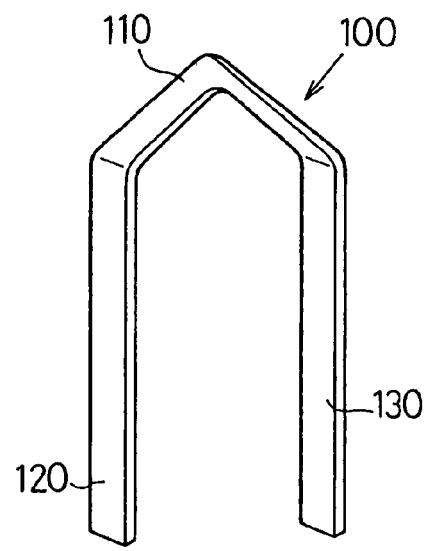
Figure 12A:
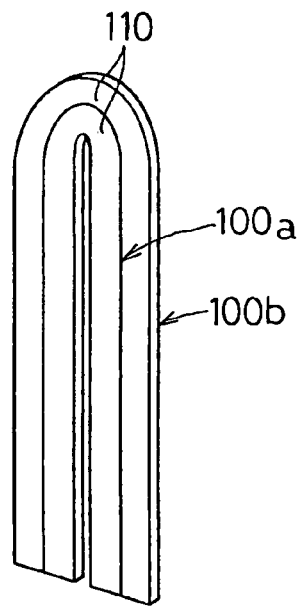
FIGS. 12A and 12B are perspective views illustrating a prior art step of manufacturing a pair of conductor segments.
Figure 12B:
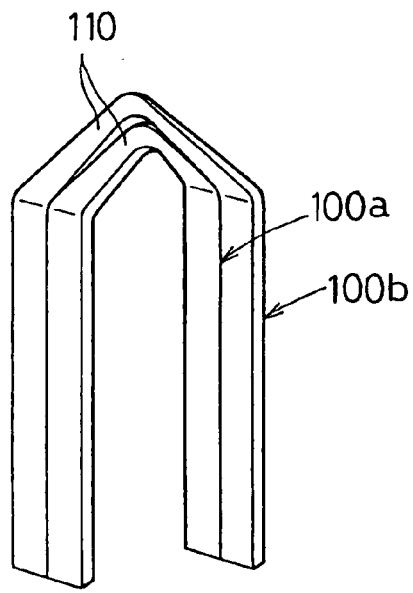
Figure 13:
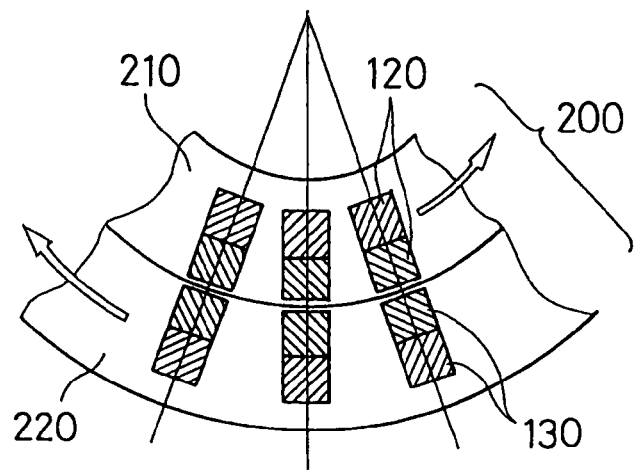
FIG. 13 is a perspective view illustrating a prior art twisting formation unit.
Figure 14:
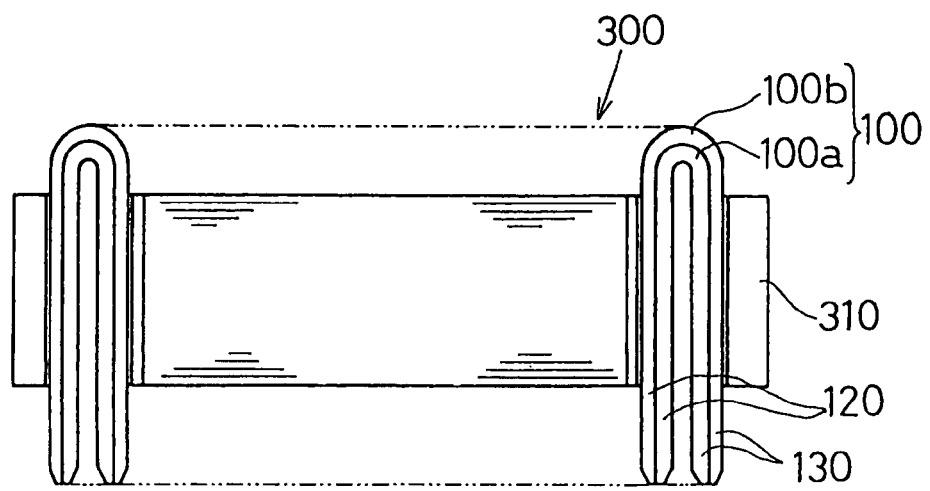
FIG. 14 is a longitudinally cross-sectional view illustrating a stator manufactured by the prior art coil forming apparatus.

With the above described coil forming apparatus, a stator coil 3 is formed as follows.

a) At first, the first conductor segment 60 and the second conductor segment 61 are set together so that the second conductor segment 61 mounts on the first conductor segment 60. Then sets of the first and second conductor segments 60, 61 are mounted in the first twisting formation unit 7 so that the inside straight portions (e.g. 6a) are inserted into the inside holding slots 7c and the outside straight portions (e.g. 6b) are inserted into the outside holding slots 7d. In the same manner, the third conductor segments 62 are mounted in the second twisting formation unit 8 so that the inside straight portions (e.g. 6a) are inserted into the inside holding slots 8c and the outside straight portions (e.g. 6b) are inserted into the outside holding slots 8d.

b) Thereafter, the twisting lever 9 is turned right, as indicated by an arrow in FIG. 1, to turn the outside ring 7b of the first twisting formation jig 7 and the outside ring 8b of the second twisting formation jig 8 relative to the inside ring 7a of the first twisting formation jig 7 and the inside ring 8a of the second twisting formation jig 8. Therefore, turn portions 6c are twisted.

c) The up-down lever 13 is moved down as indicated by an arrow in FIG. 1 to move down the first and second twisting formation jigs 7, 8. Therefore, the knocking bars 10 are moved up relative to the twisting formation jigs 7, 8 to almost discharge the first, second and third conductor segments 60-62 except the lower end thereof.

d) The compressing formation unit 5 with the cylindrical space S being provided is moved down to take the conductor segments 60-62 into the cylindrical space S. At this time, the guiding arrow members 16 are retracted to avoid interference with the third conductor segments 62.

e) The cam plate 19 is turned by a turning lever 22 to move the thrusting arrow members 18 in radially inner directions, so that the guiding arrow members 16 are pushed by the coil springs radially inward to insert the straight portions 6a, 6b of the conductor segments 60-62 into the respective guide spaces 17.

f) The up-down lever 13 is further moved down to completely discharge the first, second and third conductor segments 60-62 from the first and second twisting formation jigs 7, 8 and take the same into the guide spaces 17, as shown in FIG. 8.

g) The thrusting arrow members 18 are further moved to push the third conductor segments 62 to eliminate the gaps G and bring the conductor segments 62 to be close to the second conductor segments 61, so that six straight portions 6a, 6b of the conductor segments are aligned in each guide space 17 in a radial direction.

h) The compressing formation unit 5 is moved up while the first, second and third conductor segments 60-62 stay in the guide spaces.

i) The twisting formation unit 4 is removed from the base plate 11, and a stator core holder 24 is fixed to the base plate 11, to which a stator core 2 is set as shown in FIG. 10.

j) The first, second and third conductor segments 60-62 in the guide spaces 17 are pushed out, so that six straight portions 6a, 6b of the conductor segments 60-62 are inserted into each slot 6 of the stator core 2.

Thus it is not necessary to twist three folded conductor segments at the same time, so that the coil ends do not become excessively long in the axial direction.

It is possible to add fourth conductor segments to the third conductor segments 62 in the same manner as described above. It is also possible to add the third twisting formation unit to form six and seven conductor segments in the same manner as described above.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A method of manufacturing coils of a rotary electric machine to be mounted in a stator thereof having a predetermined number of stator slots comprising the steps of:

forming a predetermined number of pairs of U-shaped conductor segments to be disposed radially inside and outside in the stator slots, each of the U-shaped conductor segments having a pair of parallelly extending radially inside and outside straight portions and a turn portion connecting the inside and outside straight portions;

twist-forming the U-shaped conductor segments by using an inside twisting formation jig composed of a first inside ring and a first outside ring and an outside twisting formation jig composed of a second inside ring and a second outside ring; and radially compressing the U-shaped conductor segments that are twist-formed in radially inward directions, wherein the twist-forming comprises:

holding one of each pair of straight portions by one of holding slots that are circumferentially formed in each of the first and second inside rings and first and second outside rings; and coaxially rotating the first and second inside rings and the first and second outside rings to shift relative circumferential position between the inside rings and the outside rings by a predetermined angle; and wherein the compressing comprises:

setting a diameter of an inscribed circle of the conductor segments by a metal core having a cylindrical outer periphery;

forming guide spaces by a plurality of guiding arrow members respectively disposed in radial directions at equal intervals between the guiding arrow members; and compressing the conductor members in radially inner directions when straight portions of the conductor segments are disposed in the guide spaces by a plurality of thrusting arrow members respectively disposed in the guide spaces.

2. A method as in claim 1, further comprising discharging the U-shaped conductors from the inside and outside twisting formation jigs to carry out the compressing.

3. A method in claim 1, further comprising discharging the U-shaped conductors from the guide spaces after the compressing; and inserting the U-shaped conductor segments into the stator slots of the stator.

* * * * *